United States Patent
Sakamoto et al.

(10) Patent No.: US 12,005,742 B2
(45) Date of Patent: Jun. 11, 2024

(54) PNEUMATIC TIRE

(71) Applicant: The Yokohama Rubber Co., LTD., Tokyo (JP)

(72) Inventors: Yousuke Sakamoto, Kanagawa (JP); Noboru Kuwahara, Kanagawa (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 360 days.

(21) Appl. No.: 17/275,512

(22) PCT Filed: Sep. 11, 2019

(86) PCT No.: PCT/JP2019/035722
§ 371 (c)(1),
(2) Date: Mar. 11, 2021

(87) PCT Pub. No.: WO2020/054768
PCT Pub. Date: Mar. 19, 2020

(65) Prior Publication Data
US 2022/0118796 A1   Apr. 21, 2022

(30) Foreign Application Priority Data
Sep. 14, 2018   (JP) ................................. 2018-172761

(51) Int. Cl.
*B60C 11/01* (2006.01)
*B60C 11/03* (2006.01)
(Continued)

(52) U.S. Cl.
CPC ........... *B60C 11/01* (2013.01); *B60C 11/0311* (2013.01); *B60C 2011/0339* (2013.01); *B60C 13/002* (2013.01); *B60C 13/02* (2013.01)

(58) Field of Classification Search
CPC ................. B60C 11/01; B60C 2200/14; B60C 2011/013; B60C 13/002; B60C 13/02; B60C 13/001; B60C 13/00
See application file for complete search history.

(56) References Cited

U.S. PATENT DOCUMENTS

D844,546 S  *  4/2019  Sakamoto ................... D12/900
2002/0011293 A1    1/2002  Bezilla, Jr. et al.
(Continued)

FOREIGN PATENT DOCUMENTS

BR                851 A     12/2000
BR         PI0801198 A      4/2008
(Continued)

*Primary Examiner* — Justin R Fischer
*Assistant Examiner* — Wendy L Boss
(74) *Attorney, Agent, or Firm* — Thorpe North & Western

(57) ABSTRACT

To provide a pneumatic tire that provides improved driving performance on unpaved roads and cut resistance. High blocks and low blocks with different raised heights are provided as side blocks provided in a side region. One of the high blocks and one of the low blocks adjacent to each other in a tire circumferential direction are defined as a block pair. The high block and the low block included in the block pair are partially in contact with each other. Thus, a side groove between these blocks is a closed groove. In each block pair, a pair of contour lines (a first linear portion, a second linear portion, and a third linear portion) define edges on both sides, in the tire circumferential direction, of a top surface of each of the high block and the low block.

14 Claims, 5 Drawing Sheets

(51) Int. Cl.
*B60C 13/00* (2006.01)
*B60C 13/02* (2006.01)

(56) References Cited

U.S. PATENT DOCUMENTS

| | | |
|---|---|---|
| 2008/0271827 A1 | 11/2008 | Morrison et al. |
| 2010/0043934 A1* | 2/2010 | Harvey ................ B60C 11/047 |
| | | 152/209.16 |
| 2018/0065421 A1 | 3/2018 | Kuwano |

FOREIGN PATENT DOCUMENTS

| | | |
|---|---|---|
| CA | 2296804 A1 | 9/2000 |
| CN | 101298228 A | 11/2008 |
| EP | 1033265 A2 | 9/2000 |
| EP | 1987965 A2 | 11/2008 |
| ES | 2199715 T | 2/2000 |
| JP | 11-291718 A | 10/1999 |
| JP | 2000-255207 A | 9/2000 |
| JP | 2004-291937 A | 10/2004 |
| JP | 2013-119277 A | 6/2013 |
| JP | 2016-007861 A | 1/2016 |
| JP | 2016-155448 A | 9/2016 |
| JP | 2018-39372 A | 3/2018 |

\* cited by examiner

PNEUMATIC TIRE

TECHNICAL FIELD

The present technology relates to a pneumatic tire suitable as a tire used for driving on unpaved roads and in particular relates to a pneumatic tire providing enhanced driving performance on unpaved roads and enhanced cut resistance.

BACKGROUND ART

As a pneumatic tires used for driving on unpaved roads such as an uneven ground surface, a muddy ground surface, a snowy road, a sandy ground surface, and a rocky ground surface, a tire including a tread pattern, which mainly includes lug grooves or blocks having a large number of edge components and has a large groove area, is generally adopted. Furthermore, side blocks are provided in a side region more on the outer side in the tire width direction than a shoulder block positioned on the outermost side of a tread portion in a tire width direction. Such a tire has recesses and protrusions defined by grooves and blocks provided to the tread portion and the side region to achieve traction performance by biting mud, snow, sand, stones, rocks, or the like on a road surface (hereinafter, referred to collectively as "mud or the like") and has a large groove area to prevent grooves from being clogged with mud or the like, and thus provides improved driving performance on unpaved roads (for example, see Japan Unexamined Patent Publication Nos. 2016-007861 and 2013-119277).

When comparing the tires of Japan Unexamined Patent Publication Nos. 2016-007861 and 2013-119277, the tire of Japan Unexamined Patent Publication No. 2016-007861 is a type of the tire that has a relatively small groove area and that is designed in consideration of driving performance on paved roads as well. On the other hand, the tire of Japan Unexamined Patent Publication No. 2013-119277 is a type of the tire that has a large groove area and large blocks, and is designed particularly in consideration of driving performance on unpaved roads. As a result, the former has inferior driving performance on unpaved roads to that of the latter, and the latter tends to have inferior performance at the time of normal driving to that of the former. In recent years, performance requirements for tires have become diverse, and tires for driving on unpaved roads, which have the intermediate level of performance between such two types of tires, have been demanded. Thus, for example, there has been a demand for a measure to optimize the shape of the grooves or blocks for the side region to effectively improve driving performance on unpaved roads. A failure such as a chip cut is likely to occur during driving on unpaved roads, and thus enhanced cut resistance has also been required in addition to excellent driving performance on unpaved roads as described above.

SUMMARY

The present technology provides a pneumatic tire that provides improved driving performance on unpaved roads and cut resistance.

A pneumatic tire of the present technology includes: an annular tread portion extending in a tire circumferential direction; a pair of sidewall portions disposed on both sides of the tread portion; and a pair of bead portions disposed on an inner side in the tire radial direction of the sidewall portions, wherein a side region that is adjacent to an inner side in the tire radial direction of a boundary between the tread portion and the sidewall portion is provided with a plurality of side grooves extending along a tire radial direction and a plurality of side blocks defined by the side grooves and raised from an outer surface of the sidewall portion, the side blocks include two types of blocks that are high blocks with a relatively high raised height and low blocks with a relatively low raised height, the high blocks and the low blocks are alternately arranged in the tire circumferential direction, a block pair includes one of the high blocks and one of the low blocks adjacent to each other in the tire circumferential direction, and the high block and the low block included in the block pair are partially in contact with each other to make an end, on the inner side in the tire radial direction, of one of the side grooves positioned between the high block and the low block included in the block pair closed, and in each block pair, a pair of contour lines defining edges on both sides, in the tire circumferential direction, of a top surface of the high block and a pair of contour lines defining edges on both sides, in the tire circumferential direction, of a top surface of the low block are each formed by three or more linear portions connected in the tire radial direction, a first one of the linear portions, of each of the contour lines, from the boundary is defined as a first linear portion, a second one of the linear portions is defined as a second linear portion, and a third one of the linear portions is defined as a third linear portion, the first linear portions extend in an identical direction with an angle difference being equal to or smaller than 15 degrees, one linear portions that are one of the second linear portions and the third linear portions extend in an identical direction with an angle difference being equal to or smaller than 15 degrees, and other linear portions that are an other one of the second linear portions and the third linear portions include a linear portion extending in a different direction with an angle difference exceeding 15 degrees.

In the present technology, the side region is provided with the side blocks to improve the driving performance on unpaved roads. In this context, as described above, a difference in raised height is provided between side blocks (high block and low block) adjacent to each other in the tire circumferential direction, and the high block and the low block are partially in contact with each other to practically function as a single large block. Thus, excellent edge effect is maintained with recesses and protrusions formed by the block top surfaces to achieve excellent driving performance on unpaved roads, and block strength can be enhanced to improve cut resistance. With the contour lines of the blocks defined as described above, in a portion where the linear portions extend substantially in parallel (portion where the linear portions extend in with an angle difference being equal to or smaller than 15 degrees), grooves defined by the linear portions provide excellent soil discharge performance. In a portion where the linear portions are not substantially parallel with each other (a portion including a linear portion with an angle difference exceeding 15 degrees), the structure where the high block and the low block are partially in contact with each other can be reliably established. Thus, the driving performance on unpaved roads and the cut resistance can be effectively enhanced.

According to the present technology, in the high block and the low block included in the block pair, a third linear portion of one of the high block and the low block positioned on one side of the other one of the high block and the low block preferably extend toward the other one of the high block and the low block. With the third linear portion thus configured, a structure is obtained having one of the high block and the low block protruding in the circumferential direction toward the other one so that the blocks come into contact with each other. Thus, the favorable block shape is achieved, whereby the driving performance on unpaved roads and cut resistance can be effectively improved.

According to the present technology, a difference in raised height between the high block and the low block included in the block pair is preferably equal to or larger than 0.5 mm and equal to or smaller than 4.0 mm. As a result, the recesses and protrusions defined by the top surface of the high block and the top surface of the low block have a favorable shape. This is advantageous in achieving both driving performance on unpaved roads and cut resistance.

In the present technology, an area of the top surface of one of the high block and the low block included in the block pair is preferably 30% to 70% of an area of the top surface of another one of the high block and the low block. In particular, the area of the top surface of the low block included in the block pair is preferably 30% to 70% of the area of the top surface of the high block. With the sizes of the high blocks and the low blocks set to be within an appropriate range, the driving performance on unpaved roads and cut resistance can be effectively enhanced.

According to the present technology, a shoulder region that is adjacent to the inner side in the tire width direction of the boundary is preferably provided with a plurality of shoulder blocks arranged along the tire circumferential direction and shoulder lug grooves extending along the tire width direction between the shoulder blocks adjacent to each other in the tire circumferential direction, and the side grooves are preferably arranged at positions on extensions of the shoulder lug grooves. With the shoulder lug grooves and the side grooves arranged substantially continuously and the side blocks arranged on the outer side in the tire width direction of the shoulder blocks as described above, the blocks and the grooves are arranged to be in excellent positional relationship, whereby driving performance on unpaved roads can be effectively enhanced.

According to the present technology, an innermost end of the side blocks in the tire radial direction is preferably within a range, from a position on a tire equator toward the inner side in the tire radial direction, which is 30% to 60% of a tire cross-section height. The side blocks thus arranged within an appropriate range in the sidewall portion in the tire radial direction would favorably come into contact with the road surface when the tire is buried in mud or the like during driving on unpaved roads, whereby the driving performance on unpaved roads can be effectively enhanced. Furthermore, an appropriate size of the side blocks can be secured. This is advantageous in securing the block rigidity and improving cut resistance.

According to the present technology, a total area of the high blocks is preferably 32% to 52%, a total area of the low blocks is preferably 13% to 33%, and a total area of the side grooves is preferably 25% to 45%, of an area of the side region between the boundary and an innermost end of the side blocks in the tire radial direction. With the balance among the elements provided in the side region thus optimized, the driving performance on unpaved roads and the cut resistance can be effectively improved.

In an embodiment of the present technology, "tire ground contact edge" is either end portion in a ground contact region in the tire axial direction, which is formed when a regular load is applied to the tire in a state where the tire mounted on a regular rim and inflated to a regular internal pressure is placed vertically on a flat surface. "Regular rim" refers to a rim defined by a standard for each tire according to a system of standards that includes standards with which tires comply, and is a "standard rim" defined by the Japan Automobile Tyre Manufacturers Association Inc. (JATMA), a "Design Rim" defined by the Tire and Rim Association, Inc. (TRA), or a "Measuring Rim" defined by the European Tyre and Rim Technical Organisation (ETRTO). In the system of standards, including standards with which tires comply, "regular internal pressure" is air pressure defined by each of the standards for each tire and is referred to as "maximum air pressure" in the case of JATMA, the maximum value being listed in the table "TIRE LOAD LIMITS AT VARIOUS COLD INFLATION PRESSURES" in the case of TRA, and is "INFLATION PRESSURE" in the case of ETRTO. However, "regular internal pressure" is 180 kPa in a case where a tire is a tire for a passenger vehicle. "Regular load" is a load defined by a standard for each tire according to a system of standards that includes standards on which tires are based, and refers to a "maximum load capacity" in the case of JATMA, refers to the maximum value in the table of "TIRE LOAD LIMITS AT VARIOUS COLD INFLATION PRESSURES" in the case of TRA, and refers to "LOAD CAPACITY" in the case of ETRTO. "Regular load" corresponds to 88% of the loads described above for a tire on a passenger vehicle.

DETAILED DESCRIPTION

Configurations of embodiments of the present technology will be described in detail below with reference to the accompanying drawings.

Figure 1:
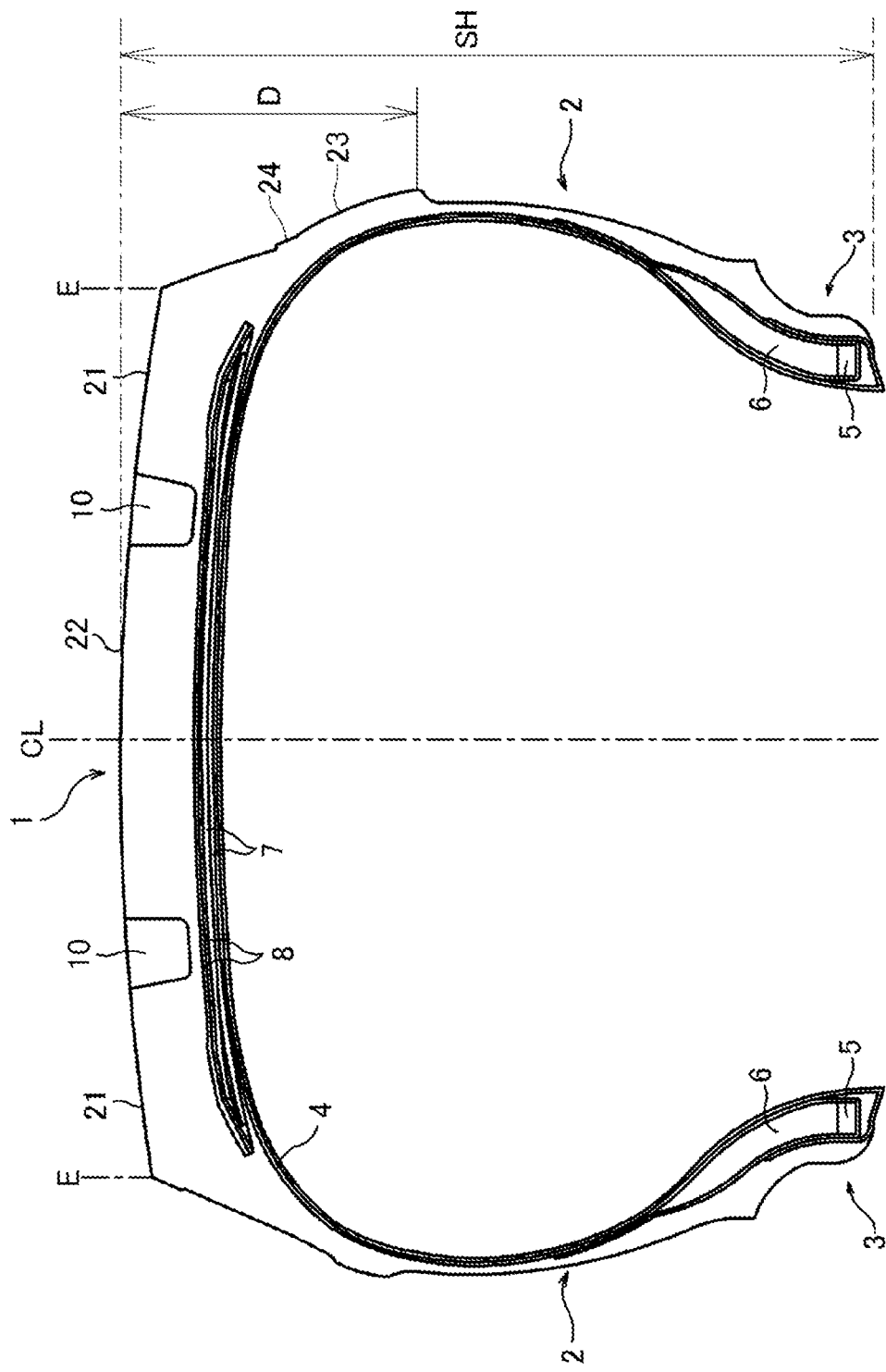
FIG. 1 is a meridian cross-sectional view of a pneumatic tire according to an embodiment of the present technology.

As illustrated in FIG. 1, a pneumatic tire of an embodiment of the present technology includes a tread portion 1, a pair of sidewall portions 2 disposed on both sides of the tread portion 1, and a pair of bead portions 3 disposed in the sidewall portions 2 at an inner side in a tire radial direction. In FIG. 1, reference sign CL denotes a tire equator, and reference sign E denotes a ground contact edge. Additionally, FIG. 1 is a meridian cross-sectional view, and accordingly, although not illustrated, each of the tread portion 1, the sidewall portions 2, and the bead portions 3 extends in the tire circumferential direction to form an annular shape. Thus, the basic structure of the toroidal shape of the pneumatic tire is configured. Although the description using FIG. 1 is basically based on the illustrated meridian cross-sectional shape, all of the tire components each extend in the tire circumferential direction and form the annular shape.

A carcass layer 4 is mounted between the left-right pair of bead portions 3. The carcass layer 4 includes a plurality of reinforcing cords extending in the tire radial direction, and is folded back around a bead core 5 disposed in each of the bead portions 3 from a vehicle inner side to a vehicle outer side. Additionally, bead fillers 6 are disposed on the periphery of the bead cores 5, and each bead filler 6 is enveloped by a main body portion and a folded back portion of the carcass layer 4. On the other hand, in the tread portion 1, a plurality of belt layers 7 (two layers in FIG. 1) are embedded on an outer circumferential side of the carcass layer 4. The belt layers 7 each include a plurality of reinforcing cords that are inclined with respect to the tire circumferential direction, with the reinforcing cords of the different layers arranged in a criss-cross manner. In these belt layers 7, the inclination angle of the reinforcing cords with respect to the tire circumferential direction ranges from, for example, 10° to 40°. In addition, a belt reinforcing layer 8 is provided on the outer circumferential side of the belt layers 7. The belt reinforcing layer 8 includes organic fiber cords oriented in the tire circumferential direction. In the belt reinforcing layer 8, the angle of the organic fiber cords with respect to the tire circumferential direction is set, for example, to from 0° to 5°.

The present technology may be applied to such a pneumatic tire having a general cross-sectional structure; however, the basic structure is not limited to the aforementioned structure.

The present technology relates to a shoulder region and a side region (the side region in particular) described below. The detailed shape of the tread portion 1 is not limited to the example illustrated in FIG. 2 as long as a tread pattern mainly including blocks suitable for unpaved roads is provided.

Figure 2:
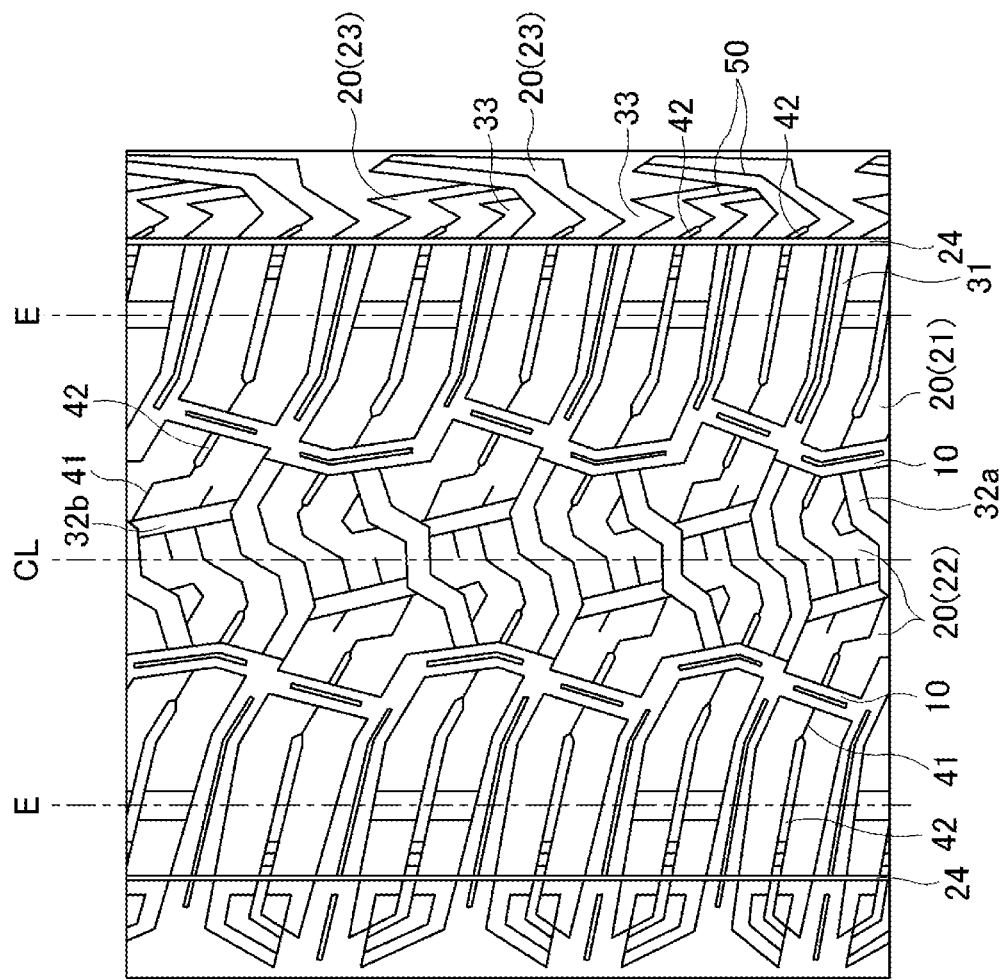
FIG. 2 is a front view illustrating a tread surface of the pneumatic tire according to the embodiment of the present technology.

A surface of the tread portion 1 of the pneumatic tire according to an embodiment of the present technology illustrated in FIG. 2 is provided with a pair of main grooves 10 extending in the tire circumferential direction on both sides of the tire equator CL. These main grooves 10 have a maximum width of, for example, from 9 mm to 20 mm and a groove depth of, for example, from 10 mm to 18 mm. As described below, these main grooves 10 have a zigzag shape in which portions that extend linearly in a predetermined direction are connected via bend points.

The three rows of land portions defined by these main grooves 10 are further defined into blocks 20 by various grooves. Thus, the tread pattern as a whole is obtained as a block pattern mainly including the blocks 20. In the illustrated example, shoulder blocks 21 are defined on the outer side in the tire width direction of a pair of main grooves of the plurality of blocks 20, and center blocks 22 are defined between the pair of main grooves. The shoulder blocks 21 are defined by shoulder lug grooves 31 extending from the main grooves 10 beyond the ground contact edge E, and a plurality of shoulder blocks 21 are arranged in the tire circumferential direction. The center blocks 22 are defined by center lug grooves 32a that connect the pair of main grooves 10 and extend in the tire width direction and auxiliary grooves 32b that connect the center lug grooves 32a adjacent to each other in the tire circumferential direction, and two rows of center blocks 22 disposed on both sides of the auxiliary grooves 32b are repeatedly arranged in the tire circumferential direction. Sipes 41 and narrow grooves 42 may be optionally provided on the contact surface of the center block 22 and on the contact surface of the shoulder block 21 and the side surface of the shoulder block 21 on the outer side in the tire width direction.

Note that, among the lug grooves that further divide the land portions defined by the main grooves 10 into blocks 20, the groove width of the shoulder lug grooves 31 may be, for example, from 9 mm to 20 mm, and the groove depth may be, for example, from 12 mm to 17 mm, and the groove width of the center lug grooves 32a may be, for example, 7 mm to 13 mm, and the groove depth may be, for example, 11 mm to 14 mm. In particular, the shoulder lug grooves 31 may have the identical groove depth as the main grooves 10. Moreover, the groove width of the auxiliary groove 32b may be, for example, from 7 mm to 10 mm, and the groove depth may be, for example, from 9 mm to 12 mm. Additionally, the optional sipe 41 is a fine groove having a groove width of from 0.5 mm to 2.0 mm, for example, and a groove depth of from 2 mm to 15 mm, for example, and the optional narrow groove 42 is a groove having a groove width and a groove depth that are sufficiently smaller than those of the main grooves 10 and the lug grooves, and the groove width is from 0.5 mm to 4.0 mm, for example, and the groove depth is from 2 mm to 15 mm, for example.

Figure 3:
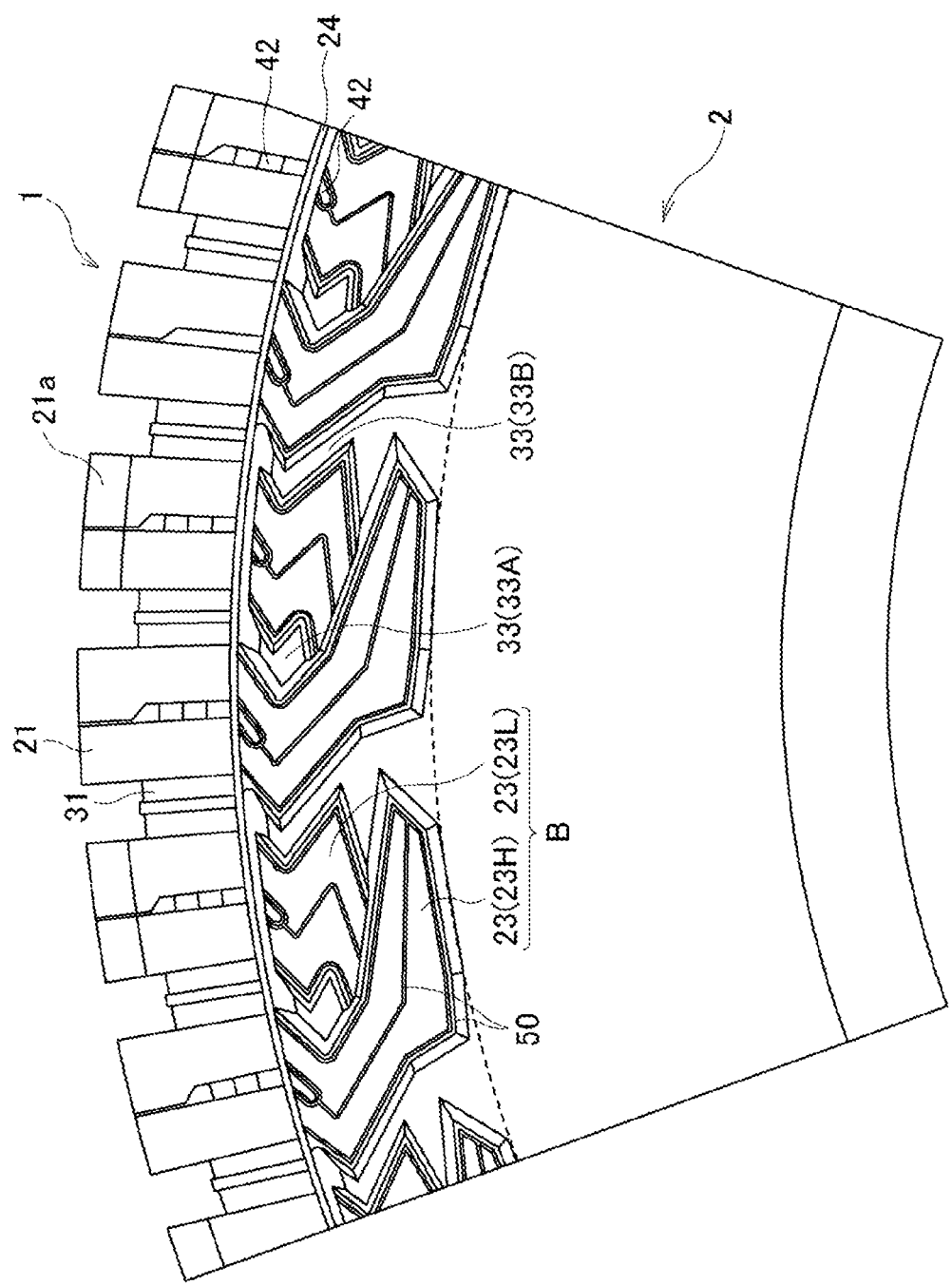
FIG. 3 is an explanatory view illustrating an enlarged main part of the pneumatic tire according to the embodiment of the present technology.
Figure 4:
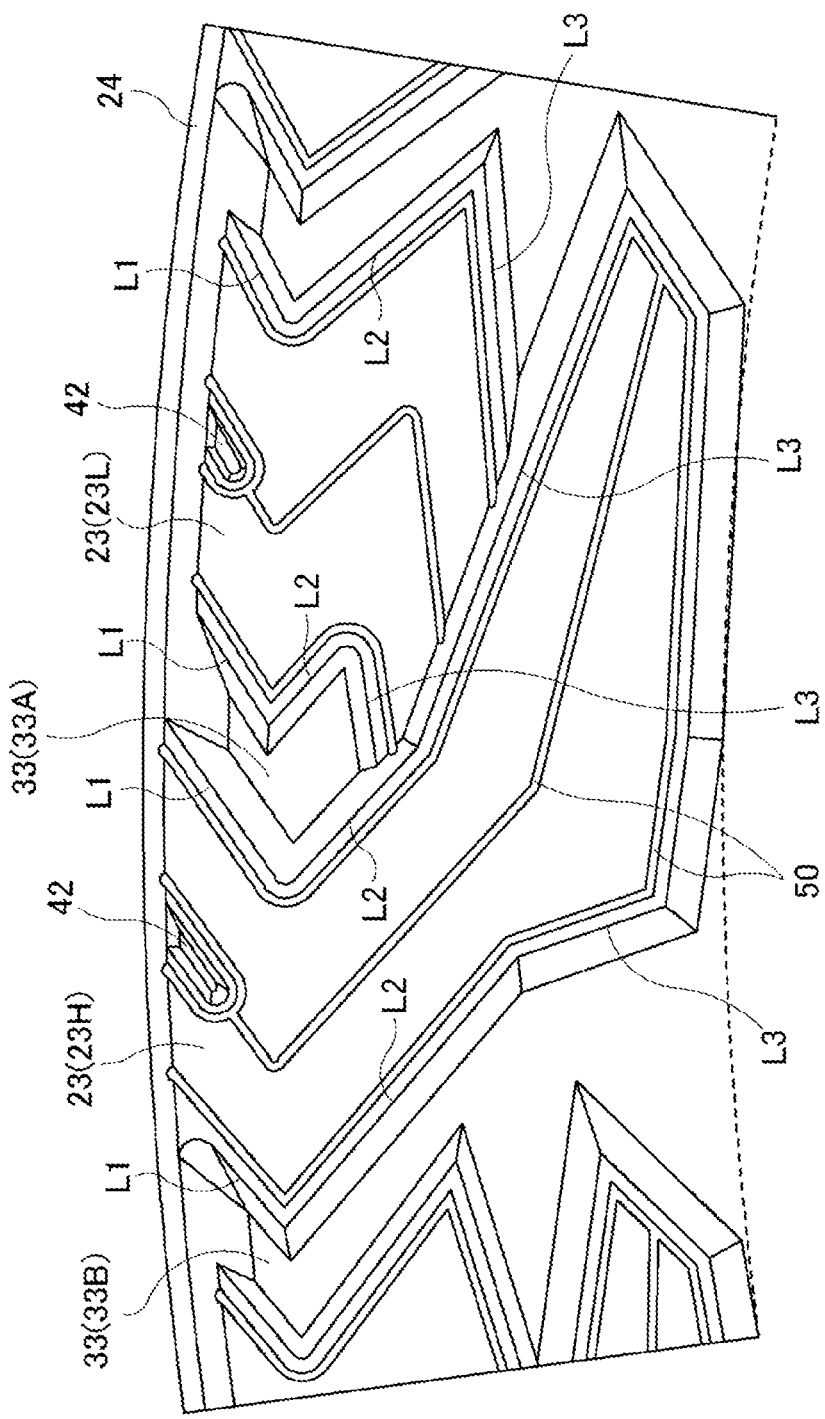
FIG. 4 is an explanatory view illustrating a block pair extracted from FIG. 3.

As illustrated in FIGS. 3 and 4, side land portions raised from the outer surface of the sidewall portion 2 are provided in the side regions adjacent to the outer side in the tire width direction of the shoulder regions provided with the shoulder blocks 21. The side land portions are further defined by the side grooves 33 into a plurality of side blocks 23. In the example illustrated in the drawings, a ridge 24 is provided at a boundary between the side surface of the shoulder block 21 on the outer side in the tire width direction and a top surface of the side block 23 (a boundary between the shoulder region and the side region). The ridge 24 extends over the entire tire circumference and is raised to be higher than the side surface and the top surface. In other words, the shoulder region is adjacent to the inner side in the tire width direction of the ridge 24 (the boundary between the shoulder region and the side region). The side region is adjacent to the inner side in the tire radial direction of the ridge 24 (the boundary between the shoulder region and the side region). The shoulder block 21 and the side block 23 described above are respectively provided on the shoulder region and the side region.

As in the illustrated example, the side grooves 33 defining the side blocks 23 are preferably positioned on an extension of the shoulder lug grooves 31 and extend substantially continuously. Based on this positional relationship between the grooves, the side block 23 is preferably arranged at positions on the extension on the outer side in the tire width direction of the shoulder blocks 21. The side block 23 and the side groove 33 are positioned on the outer side in the tire width direction of the shoulder block 21 and the shoulder lug groove 31 as viewed from the contact surface side of the tread portion 1 as illustrated in FIG. 2, and are positioned on the inner side in the tire radial direction of the shoulder block 21 and the shoulder lug groove 31 as viewed from the side of the sidewall portion 2 as illustrated in FIGS. 3 and 4. Note that the groove being positioned on the extension means that the imaginary grooves that are extensions of the grooves in question at least partially overlap in the groove width direction.

In the present technology, the side blocks 23 include two types of blocks that are high blocks 23H having a relatively high raised height and low blocks 23L having a relatively low raised height. The high blocks 23H and the low blocks 23L are alternately arranged in the tire circumferential direction. The high block 23H and the low block 23L adjacent to each other in the tire circumferential direction are defined as a block pair B. The high block 23H and the low block 23L of the block pair B are partially in contact with each other. Thus, an end of the side groove 33, on the inner side in the tire radial direction, positioned between the high block 23H and the low block 23L of the block pair B is closed. Hereinafter, the side groove 33 having the closed end on the inner side in the tire radial direction may be referred to as a closed groove 33A, and the side groove 33 positioned between the block pairs B adjacent to each other in the tire circumferential direction and having an end open on the inner side in the tire radial direction may be referred to as an open groove 33B.

Each block pair B has a pair of contour lines defining edges on both sides of the top surface of the high block 23H in the tire circumferential direction and a pair of contour lines defining edges on both sides of the top surface of the low block 23H in the tire circumferential direction. Each of the contour lines is formed with three or more linear portions connected in the tire radial direction. In each contour line, the first one of the linear portions from the boundary is defined as a first linear portion L1, the second one of the linear portions is defined as a second linear portion L2, and the third one of the linear portions is defined as a third linear portion L3. All the first linear portions L1 included in the block pair B extend in the identical direction with an angle difference equal to or smaller than 15 degrees, and thus are substantially parallel with each other. One linear portions that are one of the second linear portions L2 and the third linear portions L3 extend in the identical direction with an angle difference being equal to or smaller than 15 degrees, and thus are substantially parallel with each other, whereas the other linear portions that are the other one of the second linear portions L2 and the third linear portions L3 include a linear portion extending in a different direction with an angle difference larger than 15 degrees.

For example, in the example illustrated in FIG. 4, all the first linear portions L1 included in the block pair B extend in the identical direction with the angle difference being equal to or smaller than 15 degrees. All the second linear portions L2 included in the block pair B extend in the identical direction with the angle difference being equal to or smaller than 15 degrees, and thus are substantially parallel with each other. On the other hand, the third linear portions L3 included in the block pair B include a linear portion extending in a different direction with the angle difference larger than 15 degrees, and thus extend in directions different from each other.

Figure 5:
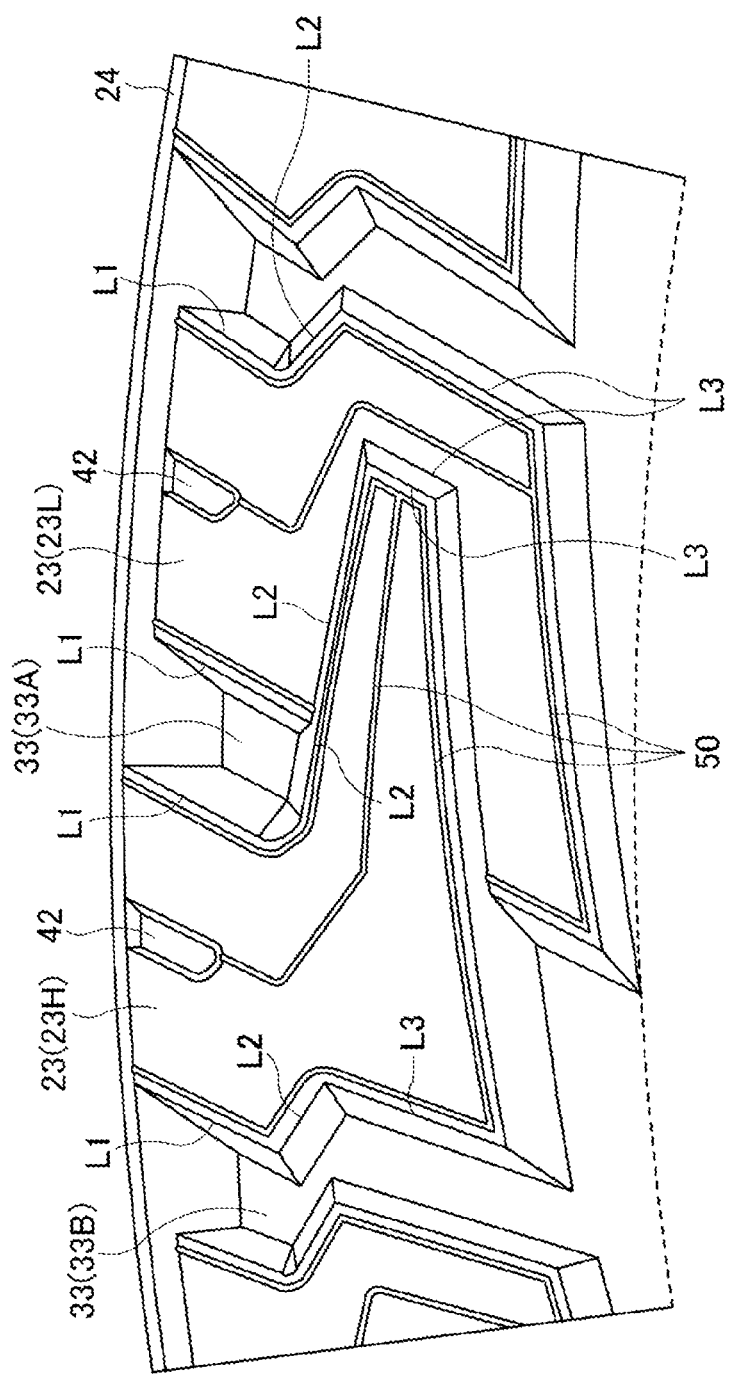
FIG. 5 is an explanatory view illustrating an example of a block pair according to another embodiment of the present technology.

Meanwhile, in the example illustrated in FIG. 5, all the first linear portions L1 included in the block pair B extend in the identical direction with the angle difference being equal to or smaller than 15 degrees. All the third linear portions L3 included in the block pair B extend in the identical direction with the angle difference being equal to or smaller than 15 degrees, and thus are substantially parallel with each other. On the other hand, the second linear portions L2 included in the block pair B include a linear portion extending in a different direction with the angle difference larger than 15 degrees, and thus extend in directions different from each other.

The first to the third linear portions L1 to L3 may be continuously arranged along the tire radial direction, smoothly with arcs provided between the linear portions. For example, any of the first linear portion L1 and the second linear portion L2 of the high block 23H on the side of the closed groove 33A in FIG. 4, the second linear portion L2 and the third linear portion L3 of the low block 23L on the side of the closed groove 33A in FIG. 4, the first linear portion L1 and the second linear portion L2 of the low block 23L on the side of the open groove 33B in FIG. 4, the first linear portion L1 and the second linear portion L2 of the high block 23H on the side of the closed groove 33A in FIG. 5, and the first linear portion L1 and the second linear portion L2 of the low block 23L on the side of the open groove 33B in FIG. 5 continue smoothly with an arc provided in between.

With the block pair B thus configured, excellent edge effect can be provided by recesses and protrusions defined by the top surfaces of the blocks due to a difference in the raised height between the side blocks 23 (the high block 23H and the low block 23L) adjacent to each other in the tire circumferential direction, whereby excellent driving performance on unpaved roads can be achieved. The high block 23H and the low block 23L are partially in contact with each other, whereby these blocks (block pair B) substantially function as a single large block. Thus, a higher block strength is achieved, whereby cut resistance can be improved. With the contour lines of each block configured as described above, in a portion where the linear portions extend substantially parallel with each other (a portion of the first linear portions L1 and the second linear portions L2 in the example illustrated in FIG. 4 and a portion of the first linear portions L1 and the third linear portions L3 in the example illustrated in FIG. 5), a groove formed by these linear portions features excellent soil discharge performance. In a portion where the linear portions are not substantially parallel with each other (the third linear portions L3 in the example illustrated in FIG. 4 and the second linear portions L2 in the example illustrated in FIG. 5), the above described structure in which the high block 23H and the low block 23L are partially in contact with each other can be reliably obtained, whereby the driving performance on unpaved roads and the cut resistance can be effectively enhanced.

In the portion where the linear portions extend substantially parallel with each other (a portion of the first linear portions L1 and the second linear portions L2 in the example illustrated in FIG. 4 and a portion of the first linear portions L1 and the third linear portions L3 in the example illustrated in FIG. 5), when the angle difference between the linear portions exceeds 15 degrees, a groove width defined by the linear portions is not uniform, and the effect of improving the soil discharge performance cannot be obtained. In the present technology, of the first to third linear portions L1 to L3 included in the three or more linear portions defining the contour lines as described above, two types of the linear portions (the first linear portions L1 and the second linear portions L2 in the example illustrated in FIG. 4, and the first linear portions L1 and the third linear portions L3 in the example illustrated in FIG. 5) extend substantially parallel with each other. If the number of types of the linear portions extending substantially parallel with each other is less than two, an inappropriate groove shape is obtained, and the effect of improving the soil discharge performance cannot be obtained.

Of the modes illustrated in FIGS. 4 and 5, the mode illustrated in FIG. 4 in which the third linear portions L3 include a linear portion extending in a different direction is more preferable. In particular, as illustrated in the figure, the third linear portion L3 of the high block 23H on the side of the closed groove 33A in the block pair B preferably extends toward the low block 23L. With the third linear portions L3 thus configured, a structure is obtained having a part of the high block 23H protruding in the circumferential direction toward the low block 23L so that the blocks come into contact with each other. Thus, the favorable block shape is achieved, whereby the driving performance on unpaved roads and cut resistance can be effectively improved. The structure illustrated may be reversed, that is, the third linear portion L3 of the low block 23L on the side of the closed groove 33A in the block pair B may extend toward the high block 23H. Also in this case, a part of the low block 23L protrudes in the circumferential direction toward the high block 23H so that the blocks come into contact with each other. Thus, the driving performance on unpaved roads and the cut resistance can be effectively enhanced.

For example, the raised height of the side block 23 may be set to be 3 mm to 7 mm for example. With this configuration, the side block 23 appropriately comes into contact with the road surface during driving on an unpaved road, whereby excellent driving performance can be provided by the side blocks 23. A difference in raised height between the high block 23H and the low block 23L included in the block pair B may preferably be set to be equal to or larger than 0.5 mm and equal to or smaller than 4.0 mm. As a result, the recesses and protrusions defined by the top surfaces of the high blocks 23H and the top surfaces of the low blocks 23L have a favorable shape. This is advantageous in achieving both driving performance on unpaved roads and cut resistance. When the difference in raised height is smaller than 0.5 mm, the raised heights are substantially the same. Thus, the edge effect based on a difference in the raised height cannot be obtained, and thus the effect of improving the driving performance on unpaved roads cannot be sufficiently obtained. When the difference in the raised height exceeds 4.0 mm, sufficient block strength of the low block 23L is difficult to secure, and thus sufficient improvement of cut resistance is difficult to achieve.

The area of the top surface of one of the high block 23H and the low block 23L included in the block pair B is preferably 30% to 70% of the top surface of the other one. With such a difference in area between the high block 23H and the low block 23L (a difference in block volume), the side blocks 23 have complicated recesses and protrusions. This is advantageous in improving the driving performance on unpaved roads. In particular, preferably, the high block 23H is designed to be relatively large. Thus, the area of the top surface of the low block 23L included in the block pair B is preferably 30% to 70% of the area of the top surface of the high block 23H. When an area of the block with the top surface having a relatively small area is smaller than 30% of the area of the top surface of the other block, the block with the top surface having a relatively small area is too small. Thus, sufficient improvement of cut resistance is difficult to achieve. When an area of the block with the top surface having a relatively small area is larger than 70% of the area of the top surface of the other block, the difference in area is small, meaning that blocks with top surfaces having approximately identical areas are arranged in the circumferential direction. In this case, the recesses and protrusions of the side blocks 23 cannot be sufficiently complicated, and thus the effect of improving the driving performance on unpaved roads is limited.

The total area of the high blocks 23H may preferably be 32% to 52% of the area of the side region between the boundary and an innermost end (see the dotted lines in FIGS. 4 and 5) of the side block in the tire radial direction. The total area of the low blocks 23L may preferably be 13% to 33% of the area of the side region. The total area of the side grooves 33 may preferably be 25% to 45% of the area of the side region. With the balance among the elements provided in the side region thus optimized, the driving performance on unpaved roads and the cut resistance can be effectively improved. The total area of the high blocks 23H or of the low blocks 23L is a sum of the areas of the top surfaces of the blocks. The total area of the side grooves 33 is a sum of the areas of the bottom surfaces of the grooves.

When the areas of the elements do not fall within the ranges described above, the balance among the elements in the side region is ruined, and the driving performance on unpaved roads and the cut resistance are difficult to achieve in a well balanced manner.

The side blocks 23 are preferably arranged in an appropriate range in the tire radial direction to be in contact with the road surface, when the tire is buried in mud or the like during driving on an unpaved road. Specifically, the innermost end of the side block 23 in the tire radial direction is preferably within a range of 30% to 60% of a tire cross-section height SH from a position of the tire equator CL toward the inner side in the tire radial direction. In other words, a distance D from the position on the tire equator CL to the innermost end of the side block 23 in the tire radial direction may preferably be 30% to 60% of the tire cross-section height SH. With the side blocks 23 thus arranged within an appropriate range in the tire radial direction of the sidewall portion 2, the driving performance on unpaved roads can be effectively enhanced. Furthermore, an appropriate size of the side blocks 23 can be secured. This is advantageous in securing the block rigidity and improving cut resistance. When the distance D is shorter than 30% of the tire cross-section height SH, the side blocks 23 are small, and cut resistance is difficult to favorably maintain. When the distance D exceeds 60% of the tire cross-section height SH, the side blocks 23 are too large, and might affect the normal driving performance. Regarding the arrangement of the side blocks 23, the boundary between the shoulder region and the side region may be positioned within a range of 20% to 25% the tire cross-section height SH, from the position on the tire equator CL toward the inner side in the tire radial direction, regardless of whether the ridge 24 is provided.

As illustrated in the figure, an edge portion on the outer side in the tire width direction of one of a pair of shoulder blocks 21 positioned on the inner side in the tire width direction of the block pair B may be provided with a scooped portion 21a processed to be a recessed surface shape recessed to be more on the inner side in the tire width direction than the edge portion on the outer side in the tire width direction of the other block. With this configuration, the shape of the edge portion of the shoulder block 21 along the tire circumferential direction is complicated, and this is advantageous in terms of improvement of the driving performance on unpaved roads.

As in the illustrated example, when the narrow grooves 42 are provided on the side surface of the shoulder block 21 on the outer side in the tire width direction, the narrow grooves 42 are preferably also provided on the top surface of the side block 23. The narrow grooves 42 provided to the side block 23 may extend toward the inner side in the tire radial direction from a position of an end portion on the inner side in the tire radial direction of the narrow groove 42 provided on the side surface of the shoulder block 21 on the outer side in the tire width direction. The narrow grooves 42 provided to the side block 23 may extend in the identical direction as the first linear portion L1 with an angle difference being equal to or smaller than 15 degrees. With this configuration, the soil discharge performance and the edge effect can be additionally provided by the narrow grooves 42. This is advantageous in improvement of the driving performance on unpaved roads.

A linear protrusion portion 50 having a width of, for example, 0.5 mm to 2.0 mm and a protruding height of, for example, 0.5 mm to 1.5 mm from the top surface of the block may be provided on the top surface of the side block 23. In the illustrated example, the linear protrusion portion 50 is provided that extends along a contour line of each side block 23 while being separated from the contour line by a distance in a range from 5 mm to 20 mm, and the linear protrusion portion 50 is provided that has one end connected to the narrow groove 42 and at the center position of the side block 23 in the tire circumferential direction, extends to pass through a middle position between a pair of contour lines of the side block 23 in the tire circumferential direction. Such a linear protrusion portion 50 also functions as an edge component, and thus is advantageous in improvement of the driving performance on unpaved roads.

As illustrated in FIG. 2, the side blocks 23 described above can provide the effects described above when provided in at least one (the right side region in the illustrated example) of the side regions on both sides in the tire width direction, as illustrated in FIG. 2. It is a matter of course that the side blocks 23 described above can be applied to both side regions on both sides in the tire width direction. As illustrated in FIG. 2, the side block 23 described above may be applied to one of the side regions, and a different shape may be used in the other side region, so that one and the other side regions in the tire width direction can be dedicated for achieving different types of performances.

Example

Pneumatic tires of 16 types according to Comparative Examples 1 to 3 and Examples 1 to 13 were prepared that have a tire size of LT265/70R17 121Q, have the basic configuration exemplified in FIG. 1, based on the tread pattern illustrated in FIG. 2, and set as in Tables 1 and 2. The items set in Tables 1 and 2 include: whether a high block and a low block of a block pair adjacent to each other in the tire circumferential direction are in contact with each other; a difference in a raised height between the high block and the low block included in the block pair; relationship regarding extending directions of a pair of contour lines (the first linear portion, the second linear portion, and the third linear portion) defining edges, on both sides in the tire circumferential direction, of each of the high block and the low block included in the block pair; associated drawing; relationship between areas of top surfaces of the high block and the low block included in the block pair; a percentage of an area of a top surface of one of the high block and the low block included in the block pair with a top surface having a relatively small size, to that of a block with a top surface having a relatively large area; a percentage of total area of each of high blocks, low blocks, and side grooves relative to the area of the side region; and a percentage of the distance D from a position on the tire equator CL to the inner most end of the side block in the tire radial direction relative to the tire cross-section height (D/SH×100%).

Regarding the column "Contact between high and low blocks" in Tables 1 and 2, "Yes" indicates a case where the high block and the low adjacent to each other in the tire circumferential direction in a block pair are in contact with each other as in FIGS. 4 and 5, and "No" indicates a case where all of the first to the third linear portions extend parallel to each other so that all the side grooves are not closed but open on the inner side in the tire radial direction. In a case where there is no difference in raised height as in Comparative Examples 1 and 2, a block at a position corresponding the high block in FIG. 4 is regarded as the high block, and a block corresponding to the low block in FIG. 4 is regarded as the low block for the sake of convenience.

Regarding the column for the extending in an identical direction of the first to the third linear portions in Tables 1 and 2, "parallel" indicates a case where the linear portions extend with an angle difference being equal to or smaller than 15 degrees, and "different direction" indicates a case where the linear portions include a linear portion extending in a different direction with the angle difference larger than 15 degrees. Regarding the column "associated drawing" in Tables 1 and 2, "FIG. 4" indicates a case where all of the first to the third linear portions extend parallel with each other, and all the side grooves are not closed but are open on the inner side in the tire radial direction, based on the block shape in FIG. 4, for the sake of convenience. Furthermore, "FIG. 4" indicates a case where, based on the block shape in FIG. 4, there is no difference in raised height between a portion corresponding to the high block and a portion corresponding to the low block, for the sake of convenience.

Regarding the column "Relationship regarding areas of top surfaces" in Tables 1 and 2, "High>low" indicates a case where the area of the top surface of the high block is larger than the area of the top surface of the low block, and "High<low" indicates a case where the area of the top surface of the low block is larger than the area of the top surface of the high block. Regarding the column "Total area" in Tables 1 and 2, when there is no difference in raised height as in Comparative Examples 1 and 2, a sum of the areas of the top surfaces of all the blocks is written in the column for "High block" and the column for the "Low block" is blank.

These pneumatic tires are evaluated for startability on an unpaved road and cut resistance using evaluation methods described below. The results are also indicated in Tables 1 and 2.

Startability

The test tires were assembled on wheels having a rim size of 17×8J, inflated to an air pressure of 350 kPa, and mounted on a test vehicle (four wheel drive SUV), and sensory evaluations on startability were performed by a test driver on unpaved roads (gravel road surfaces). Evaluation results are expressed as index values, with the value of Comparative Example 1 expressed as an index value of 100. Larger index values indicate superior startability on unpaved roads. Note that when the index value is smaller than "105", there is no substantial difference from the conventional label (Comparative Example 1 as the reference), which means that the effect of improving startability on an unpaved road is not sufficiently obtained.

Cut Resistance

The test tires were assembled on wheels having a rim size of 17×8J, inflated to an air pressure of 350 kPa, and mounted on a test vehicle (four wheel drive SUV). The total cut length was measured after traveling a distance of 1000 km on an off-road durability evaluation road. The evaluation results are expressed as index values with Comparative Example 1 being assigned the value of 100 by using reciprocals of the measurement values. A larger index value indicates a shorter total cut length and excellent cut resistance. Note that when the index value is smaller than "105", there is no substantial difference from the conventional label (Comparative Example 1 as the reference), which means that the effect of improving cut resistance is not sufficiently obtained.

TABLE 1-1

|  |  | Comparative Example 1 | Comparative Example 2 | Comparative Example 3 | Example 1 |
|---|---|---|---|---|---|
| Contact between high and low blocks |  | No | Yes | No | Yes |
| Difference in raised height | mm | 0 | 0 | 1 | 1 |
| Extending direction | First linear portion | ° | Parallel | Parallel | Parallel | Parallel |
|  | Second linear portion | ° | Parallel | Parallel | Parallel | Parallel |
|  | Third linear portion | ° | Parallel | Different direction | Parallel | Different direction |
|  | Associated drawing |  | FIG. 4' | FIG. 4" | FIG. 4' | FIG. 4 |
|  | Relationship regarding areas of top surfaces |  | — | — | High > low | High > low |
|  | Area percentage | % | — | — | 50 | 55 |
| Total Area | High block | % | 60 | 65 | 40 | 42 |
|  | Low block | % | — | — | 20 | 23 |
|  | Side groove | % | 40 | 35 | 40 | 35 |
|  | D/SH × 100 |  | 48 | 48 | 48 | 48 |
|  | Startability | Index value | 100 | 103 | 103 | 116 |
|  | Cut resistance | Index value | 100 | 104 | 103 | 116 |

TABLE 1-2

|  |  | Example 2 | Example 3 | Example 4 | Example 5 |
|---|---|---|---|---|---|
| Contact between high and low blocks |  | Yes | Yes | Yes | Yes |
| Difference in raised height | mm | 1 | 1 | 0.5 | 4 |
| Extending direction | First linear portion | ° | Parallel | Parallel | Parallel | Parallel |
|  | Second linear portion | ° | Different direction | Parallel | Parallel | Parallel |
|  | Third linear portion | ° | Parallel direction | Different direction | Different direction | Different |
|  | Associated drawing |  | FIG. 5 | FIG. 4 | FIG. 4 | FIG. 4 |
|  | Relationship regarding areas of top surfaces |  | High > low | High > low | High > low | High > low |
|  | Area percentage | % | 55 | 55 | 55 | 55 |
| Total Area | High block | % | 42 | 42 | 42 | 42 |
|  | Low block | % | 23 | 23 | 23 | 23 |
|  | Side groove | % | 35 | 35 | 35 | 35 |
|  | D/SH × 100 |  | 48 | 48 | 48 | 48 |
|  | Startability | Index value | 114 | 113 | 113 | 115 |
|  | Cut resistance | Index value | 114 | 113 | 114 | 113 |

TABLE 2-1

|  |  | Example 6 | Example 7 | Example 8 | Example 9 |
|---|---|---|---|---|---|
| Contact between high and low blocks |  | Yes | Yes | Yes | Yes |
| Difference in raised height | mm | 1 | 1 | 1 | 1 |
| Extending direction | First linear portion | ° | Parallel | Parallel | Parallel | Parallel |
|  | Second linear portion | ° | Parallel | Parallel | Parallel | Parallel |
|  | Third linear portion | ° | Different direction | Different direction | Different direction | Different direction |
|  | Associated drawing |  | FIG. 4 | FIG. 4 | FIG. 4 | FIG. 4 |
|  | Relationship regarding areas of top surfaces |  | High > low | High > low | High > low | High > low |
|  | Area percentage | % | 30 | 70 | 55 | 55 |
| Total Area | High block | % | 50 | 38 | 42 | 42 |
|  | Low block | % | 15 | 27 | 23 | 23 |
|  | Side groove | % | 35 | 35 | 35 | 35 |
|  | D/SH × 100 |  | 48 | 48 | 30 | 60 |
|  | Startability | Index value | 113 | 113 | 115 | 114 |
|  | Cut resistance | Index value | 113 | 115 | 114 | 115 |

TABLE 2-2

|  |  | Example 10 | Example 11 | Example 12 | Example 13 |
|---|---|---|---|---|---|
| Contact between high and low blocks | | Yes | Yes | Yes | Yes |
| Difference in raised height | mm | 1 | 1 | 1 | 1 |
| Extending direction | First linear portion ° | Parallel | Parallel | Parallel | Parallel |
| | Second linear portion ° | Parallel | Parallel | Parallel | Parallel |
| | Third linear portion ° | Different direction | Different direction | Different direction | Different direction |
| Associated drawing | | FIG. 4 | FIG. 4 | FIG. 4 | FIG. 4 |
| Relationship regarding areas of top surfaces | | High > low | High > low | High > low | High > low |
| Area percentage | % | 70 | 44 | 31 | 67 |
| Total Area High block | % | 33 | 52 | 42 | 45 |
| Low block | % | 23 | 23 | 13 | 30 |
| Side groove | % | 44 | 25 | 45 | 25 |
| D/SH × 100 | | 48 | 48 | 48 | 48 |
| Startability | Index value | 113 | 114 | 111 | 112 |
| Cut resistance | Index value | 114 | 113 | 112 | 111 |

As can be seen in Tables 1 and 2, any of Examples 1 to 13 achieved effective improvement of startability on unpaved roads and cut resistance, compared with Comparative Example 1. In addition, only the startability on gravel road surfaces was evaluated. However, even in the case of driving on other unpaved roads (mud roads, rocky areas, snowy roads, and the like), the tire according to an embodiment of the present technology effectively works for mud, rocks, snow, and the like on road surfaces and thus can exert excellent starting performance.

On the other hand, in Comparative Example 2, side blocks adjacent to each other in the tire circumferential direction are in contact with each other, but there is no difference in raised height between these blocks. Thus, the effect of improving the startability on unpaved roads and cut resistance was not sufficiently obtained. In Comparative Example 3, the high block and the low block adjacent to each other in the tire circumferential direction are not in contact with each other. Thus, the effect of improving the startability on unpaved roads and cut resistance was not sufficiently obtained.

The invention claimed is:

1. A pneumatic tire, comprising:
an annular tread portion extending in a tire circumferential direction;
a pair of sidewall portions disposed on both sides of the tread portion; and
a pair of bead portions disposed on an inner side in a tire radial direction of the sidewall portions,
a side region that is adjacent to an inner side in the tire radial direction of a boundary between the tread portion and the sidewall portion being provided with a plurality of side grooves extending along the tire radial direction and a plurality of side blocks defined by the side grooves and raised from an outer surface of the sidewall portion,
the side blocks including two types of blocks that are high blocks with a relatively high raised height and low blocks with a relatively low raised height, the high blocks and the low blocks being alternately arranged in the tire circumferential direction, a block pair including one of the high blocks and one of the low blocks adjacent to each other in the tire circumferential direction, and the high block and the low block included in the block pair are partially in contact with each other to make an end, on the inner side in the tire radial direction, of one of the side grooves positioned between the high block and the low block included in the block pair being closed, and
in each block pair, a pair of contour lines defining edges on both sides, in the tire circumferential direction, of a top surface of the high block and a pair of contour lines defining edges on both sides, in the tire circumferential direction, of a top surface of the low block being each formed by three or more linear portions connected in the tire radial direction, a first one of the linear portions, of each of the contour lines, from the boundary being defined as a first linear portion, a second one of the linear portions being defined as a second linear portion, and a third one of the linear portions being defined as a third linear portion, the first linear portions extending in an identical direction with an angle difference being equal to or smaller than 15 degrees, one linear portions being one of the second linear portions or the third linear portions extending in an identical direction with an angle difference being equal to or smaller than 15 degrees, and other linear portions being an other one of the second linear portions or the third linear portions including a linear portion extending in a different direction with an angle difference exceeding 15 degrees.

2. The pneumatic tire according to claim 1, wherein a third linear portion at least of one of the high block and the low block included in the block pair positioned on side of another one of the high block and the low block extends toward the other one of the high block and the low block.

3. The pneumatic tire according to claim 1, wherein a difference in raised height between the high block and the low block included in the block pair is equal to or larger than 0.5 mm and equal to or smaller than 4.0 mm.

4. The pneumatic tire according to claim 1, wherein an area of the top surface of one of the high block and the low block included in the block pair is 30% to 70% of an area of the top surface of another one of the high block and the low block.

5. The pneumatic tire according to claim 4, wherein the area of the top surface of the low block included in the block pair is 30% to 70% of the area of the top surface of the high block.

6. The pneumatic tire according to claim 1, wherein
a shoulder region that is adjacent to the inner side in a tire width direction of the boundary is provided with a plurality of shoulder blocks arranged along the tire circumferential direction and shoulder lug grooves extending along the tire width direction between the shoulder blocks adjacent to each other in the tire circumferential direction, and the side grooves are arranged at positions on extensions of the shoulder lug grooves.

7. The pneumatic tire according to claim 1, wherein an innermost end of the side blocks in the tire radial direction is within a range, from a position on a tire equator toward the inner side in the tire radial direction, which is 30% to 60% of a tire cross-section height.

8. The pneumatic tire according to claim 1, wherein a total area of the high blocks is 32% to 52%, a total area of the low blocks is 13% to 33%, and a total area of the side grooves is 25% to 45%, of an area of the side region between the boundary and an innermost end of the side blocks in the tire radial direction.

9. The pneumatic tire according to claim 2, wherein a difference in raised height between the high block and the low block included in the block pair is equal to or larger than 0.5 mm and equal to or smaller than 4.0 mm.

10. The pneumatic tire according to claim 9, wherein an area of the top surface of one of the high block and the low block included in the block pair is 30% to 70% of an area of the top surface of another one of the high block and the low block.

11. The pneumatic tire according to claim 10, wherein the area of the top surface of the low block included in the block pair is 30% to 70% of the area of the top surface of the high block.

12. The pneumatic tire according to claim 11, wherein a shoulder region that is adjacent to the inner side in a tire width direction of the boundary is provided with a plurality of shoulder blocks arranged along the tire circumferential direction and shoulder lug grooves extending along the tire width direction between the shoulder blocks adjacent to each other in the tire circumferential direction, and the side grooves are arranged at positions on extensions of the shoulder lug grooves.

13. The pneumatic tire according to claim 12, wherein an innermost end of the side blocks in the tire radial direction is within a range, from a position on a tire equator toward the inner side in the tire radial direction, which is 30% to 60% of a tire cross-section height.

14. The pneumatic tire according to claim 13, wherein a total area of the high blocks is 32% to 52%, a total area of the low blocks is 13% to 33%, and a total area of the side grooves is 25% to 45%, of an area of the side region between the boundary and an innermost end of the side blocks in the tire radial direction.

\* \* \* \* \*